United States Patent [19]
Fleming

[11] Patent Number: 5,137,129
[45] Date of Patent: Aug. 11, 1992

[54] VARIABLE SPEED TRANSMISSION

[76] Inventor: David A. Fleming, 1101 Skyline Dr., Medford, Oreg. 97405

[21] Appl. No.: 709,361

[22] Filed: Jun. 3, 1991

[51] Int. Cl.⁵ .............................................. F16D 31/00
[52] U.S. Cl. ................................... 192/58 R; 192/60
[58] Field of Search ............................... 192/58 R, 60

[56] References Cited
U.S. PATENT DOCUMENTS

| | | | |
|---|---|---|---|
| 2,498,801 | 2/1950 | Fraser | 192/60 |
| 2,708,991 | 5/1955 | Carlson | 192/60 X |
| 3,229,794 | 1/1966 | Fraser | 192/60 |
| 4,981,201 | 1/1991 | Hawkins | 192/58 R |

*Primary Examiner*—Leslie A. Braun
*Assistant Examiner*—Nicholas Whitelaw
*Attorney, Agent, or Firm*—John F. Ingman

[57] ABSTRACT

Utilizing the characteristic that a hydraulic pump, such as a gear pump, having the fluid flow from its outlet restricted will tend from the increasing internal pressure to rotate with the input shaft, a variable speed transmission is designed which includes such a hydraulic pump having a rotating input shaft coincident with the input shaft of the transmission, a fluid flow regulating unit between the fluid outlet and fluid inlet of the pump, and an output shaft connected to the external housing of the pump. The fluid flow regulation unit, which includes a first fluid containing chamber connected to the pump outlet and a second fluid containing chamber connected to the pump inlet, adjustably varies fluid flow between the two chambers. A cylindrical sleeve member, having a plurality of perforations interconnecting the two fluid containing chamber, and a blocking piston slidably installed within the cylindrical sleeve permit variation between no and full fluid flow. The blocking piston, extending concentrically within an output stem of the enclosing transmission housing, is tranversely penetrated by a pin so that the pin ends extend through a pair of opposing longitudinal slots formed in the output stem. A collar fits about the output stem to engage the pin ends so that longitudinal movement of the collar adjusts the location of the blocking piston within the perforated sleeve, permitting control of pump flow and thus rotation of the output shaft.

2 Claims, 2 Drawing Sheets

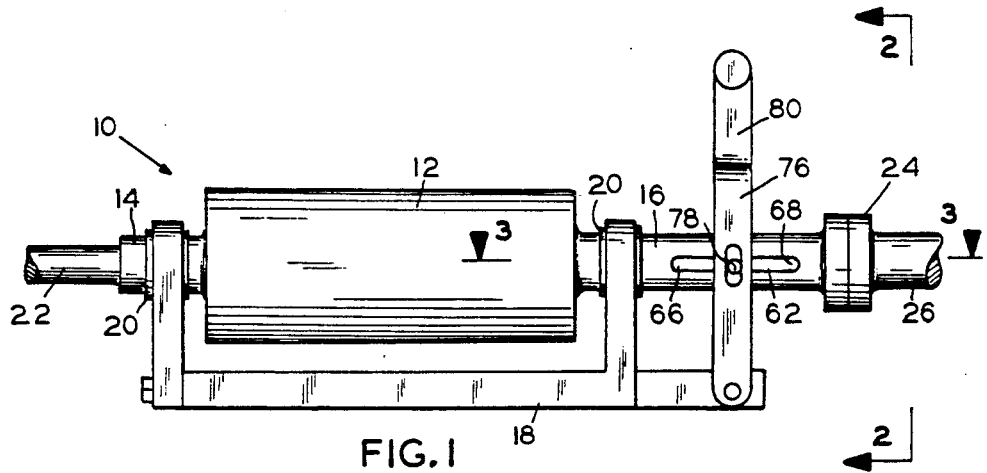
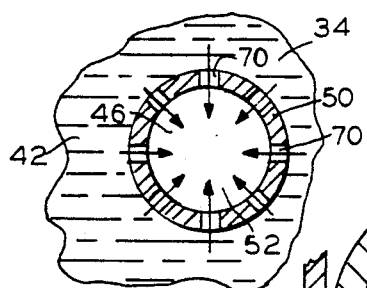
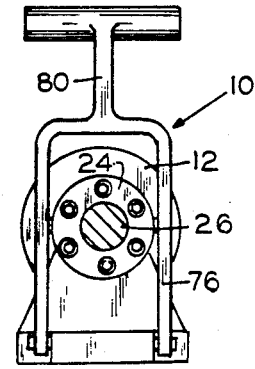
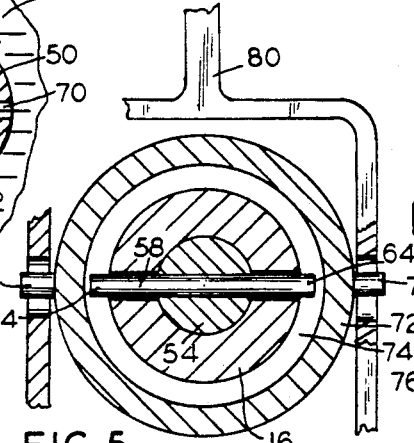
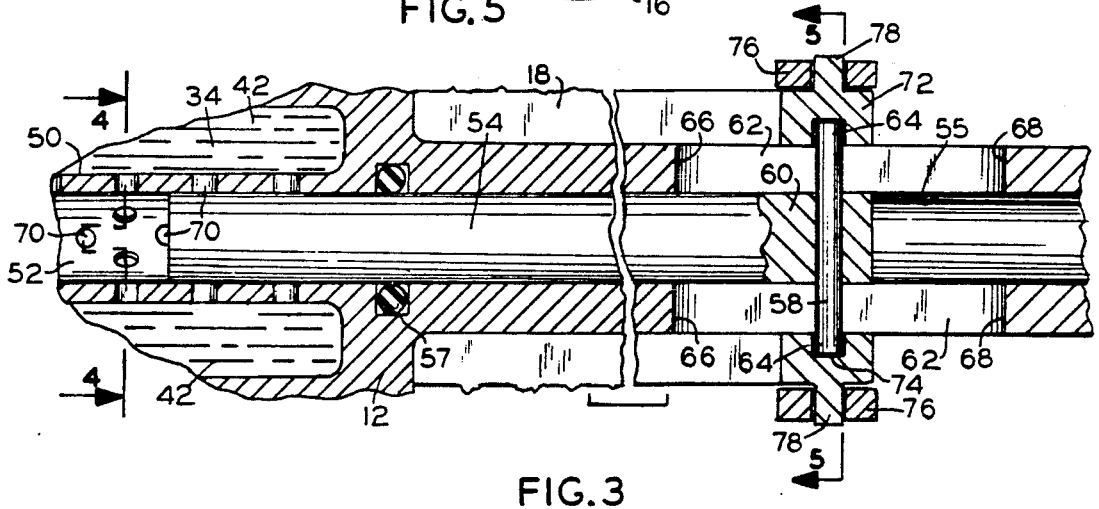

VARIABLE SPEED TRANSMISSION

BACKGROUND OF THE INVENTION

1. Field of the Invention

This invention involves a variable speed transmission, and, more particularly, a transmission apparatus wherein the output is achieved by variation of fluid flow through an input-rotated hydraulic pump.

2. Description of the Prior Art

Various variable speed transmissions have been developed. These transmissions are complex in structure, normally involving multiple pumps and valves and are expensive to manufacture and repair.

What is needed is a simple and inexpensive variable speed transmission which allows continuous control and utilizes only a single hydraulic fluid pump.

SUMMARY OF THE INVENTION

The present invention provides a variable speed transmission which is designed to satisfy the aforementioned need. The variable speed transmission involves a hydraulic pump, means for regulating fluid flow between the fluid outlet and fluid inlet of the pump, and an output shaft connected to the external housing of the pump.

A preferred embodiment of the variable speed transmission includes a gear-type hydraulic pump, having a rotating input shaft coincident with the input shaft of the transmission. The hydraulic pump conventionally includes an external housing, a fluid inlet and a fluid outlet. A fluid flow regulation unit is joined directly to the pump housing at a position opposing the input shaft; and includes a first fluid containing chamber, a second fluid containing chamber, and means for adjustably varying fluid flow between these two chambers. A preferred means for adjustably varying fluid flow includes a cylindrical sleeve member having a plurality of perforations interconnecting said first and second fluid containing chambers, and a blocking piston slidably installed within said cylindrical sleeve so that, when the piston is fully inserted, fluid flow between the two chambers is essentially blocked. When the blocking piston is partially withdrawn, a corresponding increase in fluid flow through additionally exposed perforations occurs, with full flow between the two fluid-containing chambers taking place when the blocking piston is fully withdrawn. Fluid flow conduction means, such as a tube or as formed in the housing, extend between the fluid outlet of the pump and the first fluid containing chamber. Fluid flow conduction means also extend between the second fluid containing chamber of the fluid flow regulation unit and the fluid inlet of the pump. The transmission housing, connected to and enclosing the pump, the fluid flow regulation unit, and the fluid flow conduction means between the outlet and the first fluid containing chamber, may itself provide a flow space between the outlet of the fluid flow regulation unit and the inlet of the pump.

An output stem extends outwardly from the transmission housing with the stem being connected thereto. The blocking piston extends concentrically within the output stem with a pin transversely penetrating the blocking piston at its outer end. A pair of opposing longitudinal slots are formed in the output stem through which the ends of the pin extend. A collar having an internal groove fits about the output stem so as to engage the pin ends. Longitudinal movement of the collar along the output stem will longitudinally reposition the pin within the boundaries of the slots and adjust the location of the blocking piston within the stem, and importantly, within the perforated sleeve of the fluid flow regulation unit. Therefore, by external mechanical adjustment, the number of exposed perforations within the fluid flow regulation unit may be varied, permitting control of the recirculatory flow between the outlet and inlet of the pump.

BRIEF DESCRIPTION OF THE DRAWINGS

FIG. 1 illustrates a side elevation view of the variable speed transmission.

FIG. 2 illustrates an end elevation view thereof, as seen at line 2—2 of FIG. 1.

FIG. 3 illustrates a sectional enlarged view of a means for adjusting fluid flow within the fluid flow regulation unit of the transmission.

FIG. 4 illustrates a cross-sectional view of the perforated sleeve, as seen at line 4—4 of FIG. 3.

FIG. 5 illustrates a cross-sectional elevation view of the means for adjusting fluid flow of FIG. 3, as seen at line 5—5 of FIG. 3.

DESCRIPTION OF THE PREFERRED EMBODIMENT

Figure 6:
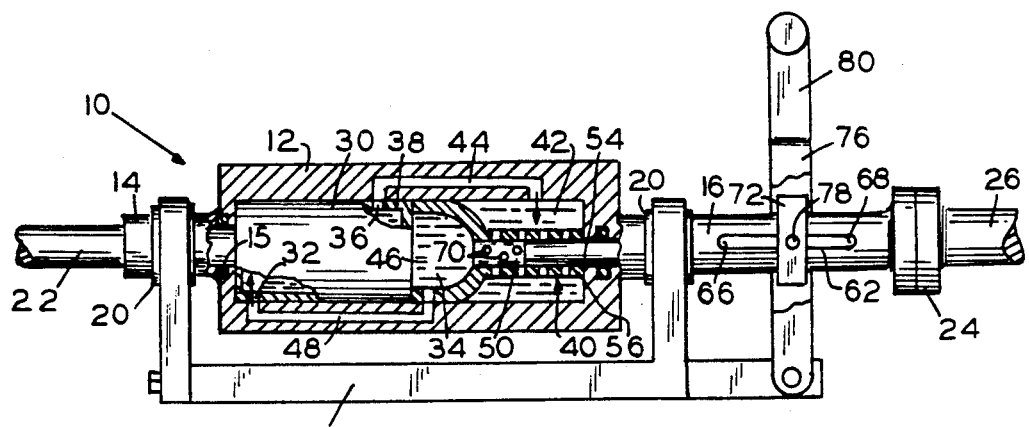
FIG. 6 illustrates a cross-sectional elevation view of the variable speed transmission, showing the blocking piston partially inserted for partial transmission of input rotation.

It is common knowledge among those skilled in the art that, with a hydraulic pump, such as a gear or vane pump, in a fixed position, if the fluid outlet is closed off but the input shaft continues to be rotated, internal pressures within the pump will continue to build up until there is an internal pump failure. An unappreciated corollary is that once the pump locks up from the increasing pressure, the pump itself, including its external housing, if unrestricted, will rotate with the input shaft. Similarly, it has been found that there is a continuum of pump housing rotation from substantially none at full internal pump flow, to full rotation corresponding to the input shaft when no fluid flow is permitted This previously unappreciated characteristic of these hydraulic pumps permits the novel design of a variable speed transmission which is both simple and economical with a broad range of applications.

Turning now to the drawings, there is shown in FIGS. 1 and 2 an external configuration of the variable speed transmission 10. A transmission housing 12 is supported by an input stem 14 and an output stem 16 which rotatingly engage a frame 18 as by conventional journal bearings 20. An input shaft 22 penetrates the transmission housing 12 through the input stem 14 while the output stem 16 is directly attached, as by a flange connection 24, to an output shaft 26. At the output stem 16, mechanical means, as subsequently described, are provided for control of the variable speed transmission 10. In operation the transmission housing 12 and the output shaft 26, being directly connected, will rotate together while the input shaft 22 will rotate independently according to the input provided by a power source (not shown).

Figure 7:
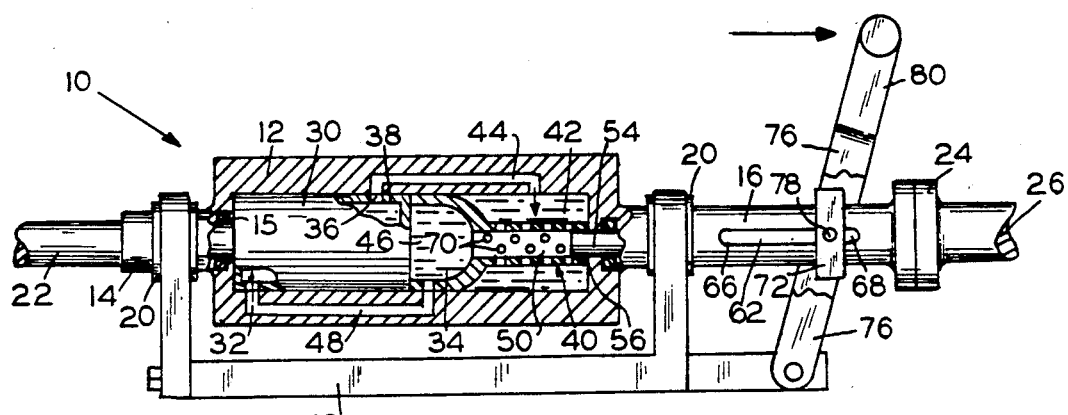
FIG. 7 illustrates a cross-sectional elevation view of the variable speed transmission, showing the blocking piston withdrawn for minimal transmission of input rotation.
Figure 8:
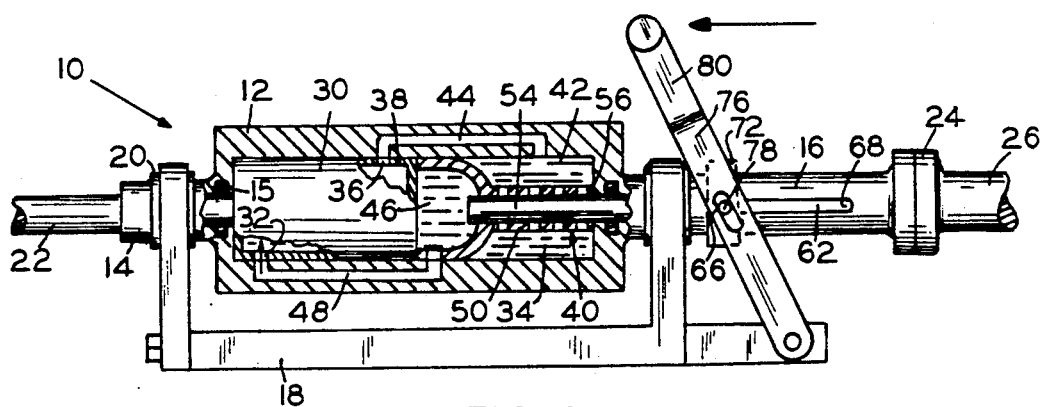
FIG. 8 illustrates a cross-sectional elevation view of the variable speed transmission, showing the blocking piston fully inserted for maximum transmission of output rotation.

As best seen in FIGS. 6 through 8, the input shaft 22 penetrates the input stem 14 through seal 15 and drives a hydraulic pump 30 which is located within and attached to the transmission housing 12. The hydraulic pump 30 is preferably a gear-type hydraulic pump, although a vane-type hydraulic pump will also work. As is clear to the person knowledgable about hydraulic pumps, a centrifugal-type hydraulic pump will not work with the present invention.

The hydraulic pump 30, as is common, has an inlet 32 which provides the source of hydraulic fluid 34 which in turn is pumped from an outlet 36.

Attached to the housing 38 of the hydraulic pump 30 at a position opposing the input shaft 22 is a fluid flow regulation unit 40 which includes a first fluid-containing chamber 42 which is directly connected to the outlet 36 of the hydraulic pump 30 by a fluid-conducting passage 44. A second fluid containing chamber 46 within the fluid flow regulation unit 40 is directly connected to the inlet 32 of the hydraulic pump 30 by a fluid conducting passage 48. In the preferred embodiment, the first fluid containing chamber 42 is ring-shaped, surrounding a perforated sleeve 50, the interior 52 of which includes a portion of the second fluid containing chamber 46. FIG. 4 shows a schematic end view of the flow of hydraulic fluid 34 from the first fluid containing chamber 42 through the perforations 70 of the perforated sleeve 50 to the second fluid containing chamber 46. A blocking piston 54 may be inserted from the outwards end 56 of the perforated sleeve 50, the piston 54 being sized so as to snugly fit within the perforated sleeve 50 so that its insertion serves to block the flow of fluid 34 through the sleeve 50 and thus from the first fluid containing chamber 42.

As best seen in FIGS. 3 and 5, the blocking piston 54 extends concentrically within the longitudinal opening 55 formed within the output stem 16. Seal 57 prevents leakage of the fluid 34 along the blocking piston 54. A pin 58 transversely penetrates the blocking piston 54 near its outer end 60. A pair of opposing longitudinal slots 62 are formed in the output stem 16 through which the ends 64 of the pin 58 extend. The slots 62 are positioned so that, with the ends 64 of the pin 58 within the slot 62 at slot end 66, the blocking piston 54 will be fully inserted within the perforated sleeve 50 so as to block flow between the first fluid-containing chamber 42 and the second fluid-containing chamber 46. With the ends 64 of the pin 58 at slot end 68, the blocking piston 54 will be fully withdrawn from the perforated sleeve 50, allowing unimpeded flow through the perforations 70 between the fluid containing chambers 42 and 46. A collar 72 having an internal groove 74 fits about the output stem 16 so as to engage the pin ends 64 within the groove 74. Thus longitudinal movement of the collar 72 will vary the position of the blocking piston 54 within the perforated sleeve 50 and thus vary the flow of fluid 34 within the fluid flow regulation unit 30. A mechanical means of longitudinal movement of the collar 72 may include a yoke 76 which is fixed to the frame 18 and extends on each side of the collar 72 where it is pivotally connected at a pin 78 of the collar 72, and thence outward to a lever 80 which may be manually operated.

FIGS. 6, 7, and 8, provide cross-sectional views of the variable speed transmission 10 at various positions of the blocking piston 54. In FIG. 7, the piston 54 is essentially in a withdrawn position, allowing maximum flow of the fluid 34 from the outlet 36, through the chambers 42 and 46 and back to the inlet 32. As described previously, this corresponds to a condition where the hydraulic pump 30 is pumping freely and the pump housing 38, the transmission housing 12 attached to the pump housing 38, and the output shaft 26, have little or no rotational movement despite the rotation of the input shaft 22.

FIG. 8 illustrates the piston 54 in a fully inserted position, thereby blocking the flow of the fluid 34 from the outlet 36 and thereby significantly raising the pressure within the hydraulic pump 30 so that the pump 30 internally locks, causing the pump housing 38 to rotate in concert with the rotation of the input shaft 22. With the transmission housing 12 attached to or formed with the pump housing 38 and the output shaft 26 directly attached to the output stem 16 of the transmission housing 12, the output shaft 26 will essentially rotate with the input shaft 22, thereby providing a full one-to-one rotational output from the variable speed transmission 10.

Finally, FIG. 6 illustrates the piston 54 in an intermediate position wherein a partial flow occurs between the outlet 36 and inlet 32 of the pump 30 as described above. Such partial flow will create increased pressure within the pump 30 with some, but not complete, rotating torque being applied to the pump housing 38 and on to the output shaft 26. There is a continuum of possible piston 54 positions within the perforated sleeve 50, so that, depending on the number and size of perforations 70, the control of the fluid flow may also be varied in a substantially continuous manner, with greater rotational output occuring as the degree of fluid flow blockage is increased.

As can be seen from FIG. 6 through 8, as the mechanical linkage, that is the lever 80, is moved to the right, as illustrated, the piston 54 is withdrawn, while when the lever 80 is moved to the left, as illustrated, the piston 54 is inserted into the perforated sleeve 50. Other means of mechanical movement of the collar 72 may be equally efficient.

It is thought that the variable speed transmission 10 of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:
1. A variable speed transmission, comprising:
 a. a hydraulic pump, including a rotating input shaft, a fluid inlet, a fluid outlet, and an external housing;
 b. means for regulating fluid flow between said fluid outlet and fluid inlet of the hydraulic pump which include a fluid flow regulation unit connected to said external housing of the hydraulic pump, said fluid flow regulation unit including:
    (1) a first fluid containing chamber and fluid flow conduction means extending between said fluid outlet of the hydraulic pump and said first fluid containing chamber;

(2) a second fluid containing chamber and fluid flow conduction means extending between said second fluid containing chamber and said fluid inlet of the hydraulic pump; and (3) means for adjustably varying fluid flow between said first fluid containing chamber and said second fluid containing chamber of the fluid flow regulation unit which include:

(a) a sleeve member having a plurality of perforations formed to interconnect said first and second fluid containing chambers;

(b) a blocking piston, slidably insertable within said sleeve member, which is formed, when fully inserted within said sleeve member, to block fluid flow through said perforated sleeve member, and when at least partially withdrawn from said sleeve member, will allow fluid flow between said first and second fluid containing chambers corresponding to the unblocking of said interconnecting perforations of said sleeve members;

c. a transmission housing connected to said external housing of said hydraulic pump so as to rotate therewith, said transmission housing providing a complete enclosure for, and internally containing, said hydraulic pump and said means for regulating fluid flow between said fluid outlet and said fluid inlet of said hydraulic pump; and d. a rotating output shaft connected to said transmission housing.

2. The variable speed transmission, as recited in claim 1, wherein additionally:

a. said transmission housing includes an output stem to which an output shaft is attached, said output stem formed to concentrically surround said blocking piston;

b. said output stem having at least one longitudinal slot formed therein;

c. said blocking piston having a transversely positioned pin which engages said slot and extends therethrough;

d. a collar which encircles said output stem and engages the extending portion of said pin;

e. means for moving said collar longitudinally along said output stem;

f. wherein the longitudinal movement of said collar, through said pin within said slot, will vary the position of said blocking piston within said perforated sleeve.

* * * * *